United States Patent [19]

Sato et al.

[11] Patent Number: 5,204,177
[45] Date of Patent: Apr. 20, 1993

[54] PROCESS FOR PREPARING CONDUCTIVE FINE PARTICLES AND CONDUCTIVE COATING MATERIALS CONTAINING SAID PARTICLES

[75] Inventors: Goro Sato; Michio Komatsu; Tsuguo Koyanagi; Masayuki Matsuda; Hiroo Yoshidome; Akira Nakashima; Kazuaki Inoue, all of Fukuoka, Japan

[73] Assignee: Catalysts & Chemicals Industries, Co., Ltd., Tokyo, Japan

[21] Appl. No.: 754,208

[22] Filed: Aug. 27, 1991

Related U.S. Application Data

[60] Continuation of Ser. No. 501,248, Mar. 29, 1990, abandoned, which is a division of Ser. No. 346,295, May 1, 1989, Pat. No. 4,937,148, Continuation-in-part of Ser. No. 21,482, Mar. 4, 1987, abandoned.

[30] Foreign Application Priority Data

| Mar. 6, 1986 [JP] | Japan | 61-50233 |
| Jul. 30, 1986 [JP] | Japan | 61-179607 |
| Dec. 22, 1986 [JP] | Japan | 61-305906 |

[51] Int. Cl.$^5$ .......................... B32B 5/16; C08K 3/10
[52] U.S. Cl. ................................. 428/328; 252/518; 524/409; 524/434; 428/918
[58] Field of Search ............... 428/328, 432, 702, 918; 524/409, 434; 252/518

[56] References Cited

U.S. PATENT DOCUMENTS

| 4,431,764 | 2/1984 | Yoshizumi | 524/409 |
| 4,495,276 | 1/1985 | Takimoto et al. | 430/527 |
| 4,568,578 | 2/1986 | Arfsten et al. | 428/34 |
| 4,571,361 | 2/1986 | Kawaguchi et al. | 428/328 |
| 4,670,188 | 6/1987 | Iwasa et al. | 252/513 |
| 4,734,319 | 3/1988 | Doi et al. | 428/216 |
| 4,775,412 | 10/1988 | Nishikura et al. | 423/618 |

FOREIGN PATENT DOCUMENTS

| 58-36925 | 3/1983 | Japan . | |
| 60-46925 | 3/1985 | Japan . | |
| 60-65724 | 4/1985 | Japan | 423/618 |
| 61-9468 | 1/1986 | Japan | 524/434 |
| 61-205624 | 9/1986 | Japan . | |

OTHER PUBLICATIONS

Chem. Abstract 102: 118370y Hashimoto et al.

Primary Examiner—George F. Lesmes
Assistant Examiner—Christopher Brown
Attorney, Agent, or Firm—Wenderoth, Lind & Ponack

[57] ABSTRACT

Transparent conductive coatings excellent in transparency are provided on substrates such as glass, plastics, etc. by the use of conductive coating materials obtained by maintaining aqueous solutions of hydrolyzable tin containing or indium containing compounds at pH of 8-12, and gradually hydrolyzing said compounds in the solutions to form sols containing colloidal particles, followed by drying and calcining.

10 Claims, No Drawings

PROCESS FOR PREPARING CONDUCTIVE FINE PARTICLES AND CONDUCTIVE COATING MATERIALS CONTAINING SAID PARTICLES

This application is a continuation of now abandoned application, Ser. No. 07/501,248 filed on Mar. 29, 1990, which in turn is a divisional of application Ser. No. 07/346,295, filed May 1, 1989, now U.S. Pat. No. 4,937,148 which in turn is a continuation of application Ser. No. 07/021,482, filed on Mar. 4, 1987, abandoned.

FIELD OF THE INVENTION

This invention relates to processes for preparing conductive fine particles, conductive coating materials containing said conductive fine particles, and substrates having thereon transparent conductive coatings formed from said conductive coating materials. More particularly, the invention relates to processes for preparing conductive fine particles capable of forming conductive coatings excellent in transparency, conductive coating materials and substrates having thereon a transparent conductive coatings excellent in transparency.

BACKGROUND OF THE INVENTION

In recent years, transparent substrates such as glass, plastics, etc. are often intended to be rendered antistatic by imparting conductive properties to the transparent substrate surface.

To impart conductive properties to the substrates, the coating materials, having been rendered conductive by the incorporation of carbon powder, metallic powder, carbon fiber or metallic fiber therein, are coated on the substrate surface. The above-mentioned procedure, however, involves such problems that because the coatings formed on the substrate surface from the coating materials referred to above assume a gray or black color, the color tone of the thus coated substrate is marred. This is because, the carbon powder, metallic powder, carbon fiber or metallic fiber incorporated into the coating materials absorbs light that permeates the substrates through said coating materials.

Furthermore, in order to impart conductive properties to the substrates, there has widely been practiced a process which comprises forming conductive coatings on the substrate surface by coating said substrate with conductive coating materials prepared by dispersing or dissolving conductive particles and binder resins in organic solvents. In this process, tin oxide, indium oxide or the like has been used as conductive particles to form conductive coatings excellent in transparency.

However, when transparent conductive coatings are intended to be formed by the use of such conductive oxides as tin oxide, indium oxide and the like as conductive particles, the transparency of the resulting conductive coatings is not always found satisfactory.

In order to solve such a problem as associated with the transparency of transparent conductive coatings, Japanese Patent Publication No. 9343/1986 discloses conductive coatings obtained by the use of conductive particles consisting of tin oxide containing antimony and having an average particle diameter of less than 0.2 $\mu$m which is smaller than the wavelength of visible light.

For preparing the conductive coating materials disclosed in Japenese Patent Publication No. 9343/1986, however, the conductive particles having an average particle diameter of less than 0.2 $\mu$m are prepared by pouring an aqueous solution having dissolved therein specific amounts of tin chloride and antimony chloride into hot water to hydrolyze said chlorides, separating the deposited sediment by filtration, rinsing the separated sediment and then subjecting said sediment to heat treatment. On that account, there has been brought about such problems as will be mentioned hereinafter. That is, as disclosed in the above-mentioned publication, when precursors of conductive fine particles are deposited in the solution by hydrolysis of the halides, the sediment obtained is in a state where very fine primary particles are aggregated. On that account, fine particles obtained by separating the sediment by filtration from the solution, rinsing the separated sediment and then subjecting the rinsed sediment to heat treatment are in a state where the primary particles have been sintered, having a broad particle size distribution in general.

Accordingly, when the conductive fine particles thus obtained are incorporated and dispersed in plastics or coating materials, the sintered fine particles must be pulverized in order to perform the incorporation and dispersion of the fine particles homogeneously. However, the grinding of such conductive fine particles as prepared through the above-mentioned sediment forming step is not always easy because they are very small in particle diameter, high in surface activity, strong in bonding strength among particles, and the sintering of the fine particles proceeds at the time of heat treatment thereof. In addition thereto, even when the such fine particles as already sintered are pulverized to fine particles so as to reduce in particle diameter, conductive fine particles having a sufficiently sharp particle size distribution cannot be obtained. Moreover, such pulverized particles have inherently strong aggregation power and hence relatively large amounts of dispersant must be used to prevent the particles from aggregating again.

OBJECTS OF THE INVENTION

The present invention is designed to solve such problems as associated with the prior art referred to above, and the first object of the invention is to provide a process for preparing conductive fine particles having a fine average particle diameter and a sharp particle size distribution, said conductive fine particles being capable of forming transparent conductive coatings excellent in transparency.

A second object of the present invention is to provide conductive coating materials which contain conductive fine particles obtained by the process of the invention and which are capable of forming transparent conductive coatings excellent in transparency.

A third object of the present invention is to provide substrates having thereon transparent conductive coatings excellent in transparency which have been formed from the conductive coating materials obtained according to the process of the invention.

SUMMARY OF THE INVENTION

A characteristic feature of the process for preparing conductive fine particles according to the present invention is that an aqueous solution of a hydrolyzable tin containing or indium containing compound is maintained under the conditions of a pH of 8-12, and the compound present in the solution is gradually hydrolyzed to form a sol containing colloidal particles, followed by drying and calcining the sol.

A characteristic feature of the conductive coating materials according to the present invention is that the conductive coating materials comprise a solution or dispersion in a solvent of (a) conductive fine particles obtained by the process for preparing conductive fine particles, and (b) a binder resin.

A characteristic feature of the substrates having thereon transparent conductive coatings according to the present invention resides in that the substrates have on the surface thereof a conductive coating formed from a conductive coating composition comprising a dispersion in a solvent of (a) conductive fine particles obtained by (i) the said conductive fine particles, (ii) conductive fine particles obtained by a process for preparing conductive fine particles, and (b) a binder resin.

The conductive fine particles obtained by the present invention have an average particle diameter of less than 0.4 μm and also a sharp particle size distribution and hence the conductive coatings obtained from the conductive coating materials containing said conductive fine particles are excellent in transparency as well as in surface smoothness.

DETAILED DESCRIPTION OF THE INVENTION

Illustrated below in detail are the processes for preparing conductive fine particles in accordance with the present invention, conductive coating materials containing said conductive fine particles, and substrates having thereon transparent conductive coatings formed from said conductive coating materials.

First, the processes for preparing the conductive fine particles are illustrated hereinafter. The conductive fine particles (a) are obtained by maintaining an aqueous solution of a hydrolyzable tin containing or indium containing compound under the conditions of pH 8–12, and gradually hydrolyzing said compound present in the solution to form a sol containing colloidal particles, followed by separation, drying and calcination of the colloidal particles.

Tin containing or indium containing compounds which are water-soluble and hydrolyzable at pH 8–12 are used as starting compounds to be employed in the present invention. Particularly usable are such tin containing compounds as potassium stannate, sodium stannate, etc., and such indium containing compounds as indium nitrate, indium sulfate, etc.

Where the metal contained in the aqueous solution of a tin containing or indium containing compound (hereinafter this aqueous solution is called the starting solution) is one species of either tin or indium, the resulting fine particles are composed of tin oxide or indium oxide. However, conductive fine particles doped with heteroelements can be obtained by dissolving small amounts of hetero-elements in the starting solution. For instance, conductive fine particles consisting of tin oxide doped with antimony or fluorine can be obtained by dissolving a small amount of tartar emetic (antimonyl potassium tartarate) or ammonium flouride in the starting solution containing a hydrolyzable tin containing compound, and conductive fine particles consisting of indium oxide doped with tin can be obtained by dissolving a small amount of a water-soluble tin compound in the starting solution containing a hydrolyzable indium containing compound.

Conductive fine particles doped with hetero-elements may also be obtained by impregnating the conductive fine particles consisting of tin oxide or indium oxide obtained in the manner as described above with aqueous solutions containing hetero-elements (for example phosphoric acid), and calcining the impregnated conductive fine particles.

A concentration of a hydrolyzable tin containing or indium containing compound in the starting solution is preferably in the range of from 0.5 to 30% by weight in general, tough the concentration may be selected optionally.

Where the hydrolyzable tin containing or indium containing compound to be contained in the starting solution coexists with a compound of a hetero-element as a dopant, these compounds are hydrolyzed under the conditions of pH 8–12, and the pH of the reaction system must be maintained always at the range of from 8 to 12 during progress of the hydrolysis reaction. If the pH of the reaction system is less than 8, the conductive fine particles obtained, undesirably come to have a broad particle size distribution, and when the pH further decreases, metal oxides, hydrous oxides or metal hydroxides resulted from hydrolysis come to be deposited as sediments which cannot be dispersed in the solution as colloidal particles, and undesirably no sol can be prepared. On one hand, when the pH of the reaction system exceeds 12, preparation of the sol is not impossible, and alkali components cannot be sufficiently removed from the colloidal particles, when said colloidal particles are filtered to separate them from the sol, and hence the fine particles finally obtained, undesirably decrease in conductivity.

Accordingly, in practicing the hydrolysis reaction of a tin containing or indium containing compound, it is practically a preferable procedure that a reactor charged with water of pH 8–12 is first provided and the starting solution and an acid solution are gradually and slowly injected, when said starting solution is alkaline, into the reactor at a feed rate so that the pH of the contents of the reactor does not deviate from the specified pH range. When the starting solution used is acidic, said starting solution and an alkaline solution are preferably injected in the same manner as above into the reactor. Although no particular limitation is placed on the solids concentration of the sol liquid formed in the reactor, generally the particle size distribution of the resulting colloidal particles tends to become broad with increasing solids content of the sol liquid. The reaction temperature of the hydrolysis may be selected usually from the temperature range of from 30° to 90° C.

By virtue of gradually hydrolyzing the starting solution under the above-mentioned pH conditions, the hydrolyzable tin containing or indium containing compound present in the solution becomes colloidal particles consisting of oxide, hydrous oxide or hydroxide thereof, and a sol liquid containing the formed colloidal particles as dispersoid is prepared. In that case, if a dopant coexists in the starting solution, colloidal particles containing the dopant are obtained. The colloidal particles obtained by hydrolysis of the starting solution have an average particle diameter of 0.05–0.3 μm, preferably 0.07–0.2 μm, and particle size distribution in which usually at least 80% of all the particles have a particle diameter of 0.5 to 1.5 times the average particle diameter. The average particle diameter and particle size distribution of the colloidal particles can be controlled by varying the concentration or feed rate of the starting solution to be supplied to the hydrolysis reaction system, and the particle size distribution becomes sharp when the concentration of the starting solution is low, and the colloidal particles having a larger particle diameter can be formed when the feed rate of the starting solution is slow.

The sol liquid as prepared is filtered to separate colloidal particles therefrom, and the colloidal particles are rinsed to remove therefrom by-product salts and others attached to said colloidal particles, then the colloidal particles are dried and calcined to obtain conductive fine particles. Subsequently, the conductive fine particles obtained are pulverized to obtain those which are usable for forming conductive coating materials. The particles separated by filtration from the sol liquid and then dried and calcinated are sintered to a certain extent and the calcined particles have a particle diameter of about 20–50 μm and a specific surface area of less than 50 $m^2/g$. In contrast thereto, the particles prepared through the known sediment forming step come to have a specific surface area of 70–100 $m^2/g$. The above facts clearly indicate that the fine particles obtained by the present invention are composed of primary particles having diameters larger than that of the conventional fine particles. The fine particles obtained according to the present invention in the manner described above can be easily released from their sintered state by pulverization, and conductive fine particles having an average particle diameter of about 0.05 to about 0.4 μm in the coating materials can be obtained by pulverizing the fine particles mentioned above by means of the usual grinding means. The fine particles thus obtained contain therein only a small amount of coarse particles having a particle diameter of greater than 0.8 μm.

Where conductive coating materials are prepared from the fine particles as will be mentioned later, the pulverization of (a) conductive fine particles may be effected before or after mixing thereof with other components such as (b) a binder resin. The conductive fine particles may be pulverized by the conventionally known milling techniques utilizing, for example, an attrition mill, a sand mill, a ball mill and a three-roll mill.

The conductive coating materials may be obtained by the use of the conductive fine particles (a) thus obtained and a binder resin (b). Usable as the binder resins (b) are those which are employed in the conventional conductive coating materials. Concretely, such resins include acrylic resins such as methacrylic resin, polyacetylene resins, urea resins, amino resins such as melamine resin, polyamide resins, polyimide resins, polyamideimide resins, polyurethane resins, polyether resins, polyester resins such as alkyd resin, epoxy resins, chloride resins such as chlorinated polyether resin, polyolefin resins such as polyethylene resin and polypropylene resin, polycarbonate resins, silicone resins, polystyrene resins, ABS resins, polysulfone resins such as polyamine sulfone resin, polyether sulfone resin and polyphenylene sulfone resin, vinyl resins such as vinyl chloride resin, vinylidene chloride resins, vinyl acetate resins, polyvinyl alcohol resin, polyvinyl carbazole resin and butyral resin, fluorine containing resins, polyphenylene oxide resins, polypyrrole resins, polyparaphenylene resins, ultraviolet-curing resins and cellulose derivatives. The mixture of the above-illustrated resins or combinations of one or two or more of copolymers of the above-mentioned resins may also be used.

In the proportion of the conductive fine particles (a) to the binder resin (b), based on the total weight of (a) and (b), the conductive fine particles (a) is 40–95% by weight, preferably 60–90% by weight. The use of the conductive fine particles (a) in an amount of less than 40% by weight is not preferable as the resulting coating becomes poor in conductivity, while the use of said amount exceeding 95% by weight is also not preferable as the adhesion between the resulting coating and a substrate and a transparency of the resulting coating both become poor.

The transparent conductive coating materials used in the present invention comprise the above-mentioned components dissolved or dispersed in solvents. Any solvents may be used so long as they are capable of dissolving or diluting the binder resins (b). Concretely, such solvents include alcohols such as methanol, ethanol, n-propanol, isopropanol, n-butanol, isobutanol, diacetone alcohol and cyclohexanol; ketones such as acetone, cyclohexanone, methyl ethyl ketone, methyl isobutyl ketone, phorone and isophrone; ethers such as ethylene glycol monomethyl ether, carbitol, ethylene glycol monoethyl ether, methyl carbitol, butyl carbitol and dioxane; esters such as ethyl acetate and n-butyl acetate; petroleum naphthas such as hexane and cyclohexane; benzols such as toluene, xylene, mesitylene and solvent naphtha; N-methyl-2-pyrrolidone and derivatives thereof. The mixture of the above-illustrated organic solvents may also be used. These organic solvents are used in such amounts that they have a viscosity capable of forming desired coatings and capable of coating desired coating materials containing the same on the substrates. Where water-soluble binder resins are used, there may also be used water as a solvent.

In preparing the conductive coating materials, there may also be used dispersant or coupling agents, in addition to the above-mentioned conductive fine particles (a) and binder resin (b), in the coating materials in order to improve the conductive fine particles in dispersibility and thereby to prevent said particles from aggregating again. Usable as the surfactants are those of anionic, nonionic or cationic type, and as the coupling agents are those of silane, titanium, aluminum, zirconium or magnesium type.

To prepare the conductive coating materials of the present invention, the above-mentioned conductive fine particles (a) and binder resin (b) are added to the solvent, thereby homogeneously dispersing said conductive fine particles in said binder resin, or the conductive fine particles and binder resin (b) are kneaded together while simultaneously milling said conductive fine particles in the manner as mentioned hereinbefore.

The conductive coating materials thus obtained are coated on such substrate as glass sheet or plastic sheet to form a conductive coating, whereupon the substrate of the present invention, which have thereon transparent conductive coatings, are obtained. To form such transparent conductive coatings on the substrates such as glass sheet and plastic sheet, the conductive coatings are coated by the known coating techniques, for example, the spinner, bar coat, dip, Meir bar or air knife technique, or the printing techniques such as gravure, screen, or roll coat technique, to a dry film thickness of 0.2–50 μm, preferably 1–20 μm, followed by drying.

The substrates having thereon transparent conductive coatings obtained in the manner now described have excellent conductive properties as well as excellent transparency, and hence they are usable as touch panel substrates or transparent electrodes for such display instruments as cathode ray tubes, liquid crystal displays, etc.

The conductive fine particles obtained according to the present invention in the manner as described hereinbefore have an average particle diameter of less than 0.4 μm and also a sharp particle size distribution, and the conductive coatings obtained from the conductive coating materials containing said conductive fine particles are excellent in transparency as well as in surface smoothness.

The present invention is illustrated below with reference to examples, but it should be construed that the invention is in no way limited to those examples.

EXAMPLE 1

A starting solution was prepared by dissolving 316.0 g of potassium stannate and 38.4 g of tartar emetic in 686 g of water. To 1000 g of water kept at 50° C. with stirring was gradually added in 12 hours the starting solution together with nitric acid, and the potassium stannate is hydrolyzed, while maintaining the pH of the system at 8.5, to obtain a sol liquid. The sol liquid was filtered to separate therefrom colloidal particles which were then rinsed to remove by-product salts therefrom. The colloidal particles separated were dried, calcined in air at 365° C. for 3 hours and further calcined in air at 650° C. for 2 hours to obtain fine particles (particles A).

EXAMPLE 2

Fine particles were obtained in the same manner as in Example 1 exept that the pH of the hydrolysis reaction system was maintained at 11.0.

EXAMPLE 3

Fine particles were obtained in the same manner as in Example 1 except that the starting solution was added in 6 hours to the water and the pH of the hydrolysis reaction system was maintained at 9.0.

EXAMPLE 4

Fine particles were obtained in the same manner as in Example 3 except that the starting solution was added in 20 hours to the water.

EXAMPLE 5

Fine particles were obtained in the same manner as in Example 3 except that the starting solution used was a solution obtained by dissolving 316.0 g of potassium stannate and 38.4 g of tartar emetic in 3183 g of water.

EXAMPLE 6

Fine particles were obtained in the same manner as in Example 3 except that the starting solution used was a solution obtained by dissolving 316.0 g of potassium stannate and 38.4 g of tartar emetic in 353 g of water.

EXAMPLE 7

Fine particles were obtained in the same manner as in Example 1 except that the starting solution used was a solution obtained by dissolving 331.8 g of potassium stannate and 17.1 g of ammonium fluoride in 686 g of water.

EXAMPLE 8

Fine particles were obtained in the same manner as in Example 1 except that the starting solution used was a solution prepared by dissolving 371.6 g of potassium stannate in 686 g of water.

EXAMPLE 9

Fine particles were obtained by impregnating the colloidal particles obtained in Example 8 with 2.6 g of phosphoric acid.

EXAMPLE 10

Fine particles were obtained in the same manner as in Example 1 except that the starting solution was prepared by dissolving 316.0 g of potassium stannate and 38.4 g of tartar emetic in 328 g of water.

EXAMPLE 11

There were prepared a solution of 79.9 g of indium nitrate in 686 g of water and a solution of 12.7 g of potassium stannate in 10 wt % potassium hydroxide solution. The indium nitrate solution and potassium stannate solution were added in 2 hours to 1000 g of water kept at 50° C. with stirring to effect hydrolysis while maintaining the pH of the system at 11, whereby a sol liquid was obtained. This sol liquid was filtered to separate therefrom colloidal particles which were then rinsed to remove by-product salts therefrom, and thereafter the colloidal particles were dried, calcined in air at 350° C. for 3 hours and then calcined in air at 600° C. for 2 hours to obtain fine particles (particles B).

EXAMPLE 12

Fine particles were obtained in the same manner as in Example 11 except that the indium nitrate solution and potassium stannate solution were added to the hot water in an extended period of time of 7 hours.

EXAMPLE 13

Fine particles were obtained in the same manner as in Example 11 except that the pH value of the hydrolysis reaction system was maintained at 12.

COMPARATIVE EXAMPLES 1-2

Fine particles were respectively obtained in the same manner as in Example 1 except that the pH value of the respective hydrolysis reaction systems were maintained at 7 and 13, respectively.

COMPARATIVE EXAMPLES 3-4

Fine particles were respectively obtained in the same manner as in Example 11 except that the pH values of the respective hydrolysis reaction systems were maintained at 7 and 13, respectively.

COMPARATIVE EXAMPLE 5

A solution of 173 g of tin chloride and 20.9 g of antimony chloride in 300 cc of methanol was added in 4 hours to 3000 g of water kept at 90° C. with stiring to effect hydrolysis. The precipitate formed was separated by filtration from the solution, rinsed, dried and then calcined in air at 500° C. for 2 hours to obtain fine particles (particles C). (This Comparative Example 5 is the same Example 1 in Japanese Patent Publication No. 9343/1986.)

Colloidal particles dispersed in each of the sol liquids obtained in the foregoing examples and comparative examples were measured in average particle diameter to obtain a particle size distribution thereof, and the fine particles obtained likewise were also measured in average particle diameter, specific surface area and specific resistance. The results obtained were as shown in Table 1. The measurements were conducted according to the following procedures.

Average Particle Diameter

Using an ultracentrifugal particle size measuring apparatus (CAPA-500 manufactured and sold by Horiba Seisakusho K. K.), the solids concentration of the liquid to be tested was adjusted to 0.5 wt %. The measurement of average particle diameter was conducted by way of centrifugal sedimentation of 5000 rpm in the case of colloidal particles, and by natural sedimentation in the case of fine particles.

Specific Surface Area

The specific surface area of fine particle was determined by the B.E.T. method.

Specific Resistance

The specific resistance of fine particles was determined by applying a pressure of 100 kg/cm$^2$ to a given amount (0.5 g) of the fine particles.

This coating material was coated to a dry film thickness of about 1.0 μm with a bar coater #6 on a polyethylene terephthalate (PET) film of 100 μm in thickness, and then dried at 110° C. for 30 minutes to obtain a coating thereon.

EXAMPLE 15

A mixture was prepared by adding 150 g of the particles A obtained in Example 1 and 26.5 g of a melamine resin to 200 g of a 1:1 mixed solvent of methyl ethyl ketone/toluene, and the mixture was milled with a sand mill for 5 hours to obtain a coating material.

This coating material was coated to a dry film thickness of about 1.5 μm with a bar coater #6 on a glass sheet, and then dried at 150° C. for 10 minutes to obtain a coating thereon.

EXAMPLE 16

A mixture was prepared by adding 150 g of the particles A obtained in Example 1 and 150 g of a vinyl chloride/vinyl acetate copolymer resin to 500 g of a 1:1

TABLE 1

| | | Sol liquid formed | | | Calcined particle | | |
|---|---|---|---|---|---|---|---|
| | pH condition | Average particle diameter (μm) | Particle size distribution (%) | Solid content (wt %) | Specific resistance (Ω·cm) | Specific surface surface (m$^2$/g) | Average particle diameter (μm) |
| Example 1 | 8.5 | 0.10 | 88 | 5.0 | 0.8 | 40 | 35 |
| Example 2 | 11.0 | 0.10 | 90 | 5.0 | 2.0 | 50 | 40 |
| Example 3 | 9.0 | 0.07 | 85 | 5.0 | 1.0 | 42 | 43 |
| Example 4 | 9.0 | 0.20 | 86 | 5.0 | 1.2 | 39 | 50 |
| Example 5 | 9.0 | 0.08 | 98 | 2.0 | 0.9 | 43 | 42 |
| Example 6 | 9.0 | 0.10 | 80 | 5.0 | 1.0 | 40 | 31 |
| Example 7 | 8.5 | 0.10 | 85 | 5.0 | 1.3 | 36 | 33 |
| Example 8 | 8.5 | 0.10 | 82 | 5.0 | $1 \times 10^5$ | 38 | 38 |
| Example 9 | 8.5 | 0.10 | 82 | 5.0 | $1 \times 10^3$ | 38 | 36 |
| Example 10 | 8.5 | 0.30 | 80 | 18.0 | 0.9 | 40 | 46 |
| Example 11 | 11.0 | 0.10 | 91 | 5.0 | 1.3 | 35 | 42 |
| Example 12 | 11.0 | 0.15 | 85 | 5.0 | 1.2 | 30 | 35 |
| Example 13 | 12.0 | 0.20 | 87 | 5.0 | 1.0 | 25 | 29 |
| Compar. Example 1 | 7 | 0.95 | 50 | 5.0 | 0.1 | 70 | 40 |
| Compar. Example 2 | 13 | 0.03 | 95 | 5.0 | $1 \times 10^2$ | 90 | 42 |
| Compar. Example 3 | 7 | 0.70 | 50 | 5.0 | 2.5 | 25 | 35 |
| Compar. Example 4 | 13 | 0.02 | 90 | 5.0 | 30 | 62 | 33 |
| Compar. Example 5 | — | — | — | 3.4 | 0.7 | 80 | 2 |

(Note)
Particle size distribution = wt % of particles in the range of Dp ± Dp/2 (Dp represents an average particle diameter.)

As can be seen from Table 1, in the case of conductive fine particles obtained by the present invention, as compared with conventional conductive fine particles obtained through the sediment forming step, primary particles which constitute the fine particles are big in size and consequently weak in sintering power. On that account, the conductive fine particles obtained by the process of the present invention can easily be released by oridinary grinding means from their sintered state and the desired fine particles having a particle diameter of about 0.05 to about 0.4 μm can be obtained.

EXAMPLE 14

A mixture was prepared by adding 150 g of the particles A obtained in Example 1 and 64 g of a butyral resin to 500 g of a mixed solvent of isopropanol/n-butanol (1/1 weight ratio), and this mixture was milled with a sand mill for 2 hours to obtain a coating material.

mixed solvent of methyl ethyl ketone/toluene, and the mixture was milled with a sand mill for 3 hours to obtain a coating material.

This coating material was coated to a dry film thickness of about 1.0 μm with a spinner (2000 rpm) on a PET film of 100 μm in thickness, and then dried at 110° C. for 10 minutes to obtain a coating thereon.

COMPARATIVE EXAMPLE 6

A coating was obtained under the same conditions as in Example 14 except that the fine particles used were the particles C obtained in Comparative Example 5.

EXAMPLE 17

A mixture of 150 g of the conductive particles B obtained in Example 11, 64 g of an ultraviolet-curing resin (DH-706 produced and sold by Daihachi Kagaku K.K.) and 500 g of isophorone was milled with a three-roll mill to obtain a coating material.

This coating material was coated to a dry film thickness of about 5 μm by screen printing on a glass sheet and cured with ultraviolet rays to obtain a coating thereon.

EXAMPLE 18

Fine particles (particles D) was prepared under the same conditions as in Example 11 except that 1.6 g of ammonium fluoride was added at the time of mixing the indium nitrate solution and the potassium stannate solution together. A mixture of 150 g of the particles D, 30 g of polyvinyl carbazole (Tubicoal produced and sold by Anan Koryo K.K.), 7.5 g of an ultraviolet-curing resin (DH-706 produced and sold by Daihachi Kagaku K.K.) and 200 g of cyclohexane was milled with a sand mill for 2 hours to obtain a coating material. This coating material was coated to a dry film thickness of about 7 μm with a spinner (300 rpm) on an acrylic resin sheet, and then cured with ultraviolet rays to obtain a coating thereon.

EXAMPLE 19

The coating was obtained in the same manner as in Example 14 except that the fine particles used were obtained in Example 9.

The coating marterials obtained in the foregoing examples and comparative examples were measured according to the following procedures. Average particle diameter and coarse particle content having a particle diameter greater than 0.8 μm were determined by an ultracentrifugal particle size measuring appratus (CAPA-500 manufactured and sold by Horiba Seisakusho K.K.). The solids content of the coating materials to be test was adjusted to 0.5 wt % and the measurement was conducted by way of centrifugal sedimentation of 5000 rpm.

The total light transmittance (Tt) and the haze (H) of coatings were determined by a haze computer (manufactured and sold by Suga Shikenki K.K.).

The surface resistance (Rs) of coatings was determined by electrode cell (manufactured and sold by YHP). Results are shown in Table 2.

TABLE 2

| | Coating material | | Coating | | |
|---|---|---|---|---|---|
| | Average particle diameter (μm) | Coarse particles* (wt %) | Rs (Ω/□) | Tt (%) | H (%) |
| Example 14 | 0.20 | 5.0 | $5 \times 10^7$ | 88.0 | 4.0 |
| Example 15 | 0.20 | 5.0 | $6 \times 10^6$ | 87.3 | 3.1 |
| Example 16 | 0.20 | 5.0 | $2 \times 10^8$ | 87.0 | 4.5 |
| Compar. Example 6 | 0.30 | 20.0 | $4 \times 10^6$ | 87.0 | 12.5 |
| Example 17 | 0.32 | 7.0 | $3 \times 10^4$ | 85.0 | 15.9 |
| Example 18 | 0.31 | 7.1 | $1 \times 10^3$ | 80.0 | 10.0 |
| Example 19 | 0.30 | 6.0 | $9 \times 10^7$ | 89.0 | 6.0 |

*The coarse particles are intended to designate those having a particle diameter of greater than 0.8 μm.

It is understood from Table 2 that in accordance with the present invention there are obtained substrates having thereon conductive coatings which are less in content of coarse particles having a particle diameter of greater than 0.8 μm and which are excellent in transparency.

What is claimed is:

1. A conductive coating material consisting of solution or dispersion in a solvent of
    (a) conductive fine particles obtained by pulverizing calcined particles having a specific surface area of less than 50 m²/g prepared by hydrolyzing a hydrolyzable tin containing or indium containing compound in an aqueous solution while controlling the pH of said solution substantially constant within the range of 8–12, so that an aqueous sol containing colloidal particles may be formed, followed by separation, drying and calcination of the colloidal particles, and
    (b) a binder resin.

2. The coating material as set forth in claim 1 wherein the tin containing compound is potassium stannate or sodium stannate, and the indium containing compound is indium nitrate or indium sulfate.

3. The coating material as set forth in claim 1 wherein the temperature at which the hydrolysis is carried out is 30°–90° C.

4. The coating material as set forth in claim 1 wherein the proportion of (a) the conductive fine particles to (b) the binder resin is 40–90% by weight based on the total weight of (a) and (b).

5. The coating material as set forth in claim 1 wherein the conductive fine particles have an average particle diameter of between 0.05 and 0.4 μm.

6. A substrate having on the surface thereof a transparent conductive coating formed from a conductive coating material comprising solution or dispersion in a solvent of
    (a) conductive fine particles obtained by pulverizing calcined particles having a specific surface area of less than 50 m²/g prepared by hydrolyzing a hydrolyzable tin containing or indium containing compound in an aqueous solution while controlling the pH of said solution substantially constant within the range of 8–12, so that an aqueous sol containing colloidal particles may be formed, followed by separation, drying and calcination of the colloidal particles, and
    (b) a binder resin.

7. The substrate as set forth in claim 6 wherein the tin containing compound is potassium stannate or sodium stannate, and the indium containing compound is indium nitrate or indium sulfate.

8. The substrate as set forth in claim 6 wherein the temperature at which the hydrolysis is carried out is 30°–90° C.

9. The substrate as set forth in claim 6 wherein the proportion of (a) the conductive fine particles to (b) the binder resin is 40–95% by weight based on the total weight of (a) and (b).

10. The substrate as set forth in claim 6 wherein the conductive fine particles have an average particle diameter of between 0.05 and 0.4 μm.

* * * * *